United States Patent [19]

Brois

[11] Patent Number: 4,867,753
[45] Date of Patent: Sep. 19, 1989

[54] OLEFINIC HYDROCARBON MODIFICATION WITH SULFUR IMIDES

[75] Inventor: Stanley J. Brois, Westfield, N.J.

[73] Assignee: Exxon Chemical Patents Inc., Linden, N.J.

[21] Appl. No.: 243,863

[22] Filed: Sep. 13, 1988

Related U.S. Application Data

[62] Division of Ser. No. 036,015, Apr. 8, 1987, Pat. No. 4,772,406.

[51] Int. Cl.$^4$ ................................................ C10L 1/24
[52] U.S. Cl. ........................................ 44/71; 44/72; 44/76; 44/63
[58] Field of Search .......................... 44/71, 72, 76, 63

[56] References Cited

U.S. PATENT DOCUMENTS 3,499,838  3/1970  Braid ........................................ 44/74
4,772,406  9/1988  Brois ................................... 252/47.5

Primary Examiner—Ferris H. Lander
Assistant Examiner—Jerry D. Johnson
Attorney, Agent, or Firm—W. G. Muller; M. B. Kapustij

[57] ABSTRACT

Hydrocarbon compositions, including oligomers and polymers, for use in improving the thermo-oxidative stability and the dispersancy and viscosity index improvement (for high molecular weight) properties of fuels and lubricating oils are disclosed. These compositions are adducts of sulfur mono- and diimides having one of the following formulae:

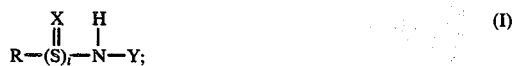

(I)

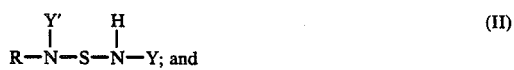

(II)

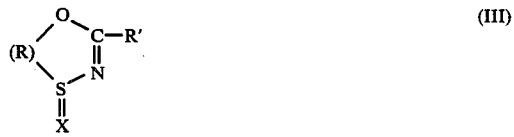

(III)

wherein R is a hydrocarbyl containing at least 18 carbon atoms, in which X= can be O=, S=, Y'—N=, i is 0 or 1, —Y and Y'— can be

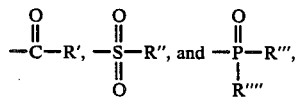

wherein R' is hydrocarbyl or hydrocarbyloxy, R" is hydrocarbyl, R''' and R'''' are hydrocarbyloxy, and each of R', R", R''', and R'''' is from 1 to 20 carbon atoms.

17 Claims, No Drawings

OLEFINIC HYDROCARBON MODIFICATION WITH SULFUR IMIDES

This is a division of application Ser. No. 036,015 filed Apr. 8, 1987, now U.S. Pat. No. 4,772,406.

FIELD OF THE INVENTION

This invention relates to specified nitrogen- and sulfur-containing hydrocarbon compounds, specifically hydrocarbon and polymeric adducts. More particularly, this invention relates to the use of specified nitrogen- and sulfur-containing hydrocarbon and polymeric adducts as additives, particularly as oil additives. Still more particularly, this invention relates to methods for the preparation of these hydrocarbon and polymeric additives, as well as to methods for their use.

BACKGROUND OF THE INVENTION

Nitrogen- and sulfur-containing hydrocarbon and polymeric compositions have been shown to possess useful properties in a broad range of applications. Several of these sulfur- and nitrogen-containing hydrocarbon compositions are known to have beneficial properties when adapted for use as additives in hydrocarbon fuel and lubricating oil compositions. Such compounds of low molecular weight, such as above about 250 and below about 5,000 number-average molecular weight ($\overline{M_n}$), or below about 10,000 weight-average molecular weight ($\overline{M_w}$), have shown utility as additives in both hydrocarbon fuels and lubricating oils whereby enhanced anticorrosion, oxidation inhibition and/or dispersancy activity are imparted to these hydrocarbons. When of high molecular weights, such as above about 4,000 $\overline{M_n}$ or 10,000 $\overline{M_w}$, such compounds are known to impart viscosity index (V.I.) improving properties to lubricating oil composition in addition to the properties exhibited by the low molecular weight compounds.

For example, it is known that multifunctional viscosity index improvers containing nitrogen have enhanced dispersant activity In particular, polymeric nitrogen-containing substances are known to be useful as lubricating additives, with detergent-dispersant and other properties. For example, U.S. Pat. No 4,194,984 teaches the incorporation of ethylenically unsaturated, nitrogen-containing organic reactants onto substantially saturated hydrocarbon backbone chains with side chain unsaturation. In particular, this patent discloses the incorporation of acrylonitrile onto terpolymers of ethylene-propylene and 5-ethylidene-2-norbornene by a thermal ene reaction. The product disclosed in this patent is said to be a dispersant when having an $\overline{M_n}$ of from about 1,000 to 10,000 and to be a viscosity index improver with dispersant-detergent properties when having an $\overline{M_n}$ of from about 10,000 to 200,000. This patent specifically discusses the benefits of a thermal addition as compared to the free radical copolymerization or grafting of nitrogen-containing compounds with or onto V.I. improving polymeric substances. It also suggests the inclusion of sulfur atoms in the nitrogen-containing ethylenically unsaturated reactants, but does not suggest the addition of any reactants which have one or more reactive sulfur-to-nitrogen unsaturated sites to any hydrocarbon backbone chain.

It is also quite well known in this art to incorporate sulfur-containing compounds into lubricating oil additives for the purpose of improving the oxidation properties of crankcase lubricants, for example. As an example, U.S. Pat. No. 4,177,153 teaches the use of oil-soluble sulfurized olefins with oil-soluble tertiary amines for additive compositions providing improved anti-oxidant properties. This reference, however, does not suggest the thermal incorporation of a single unsaturated sulfur- and nitrogen-containing reactant onto a hydrocarbon compound.

It is also known in the art to sulfurize nitrogen-containing multifunctional additive polymers. The resultant nitrogen and sulfur-containing compositions have been shown to possess antioxidant, oxidation or thermal stability and corrosion-inhibiting properties, in addition to their dispersant-detergent properties at low molecular weights and V.I. improving properties at higher molecular weights. For example, U.S. Pat. No. 3,390,086 teaches the treatment of certain ashless dispersants, including aminated low molecular weight polyisobutenyl succinic anhydrides, with elemental sulfur to improve thermal stability for high temperature uses. In addition, U.S. Pat. No. 3,309,316 teaches the sulfurization of an alkenyl substituted succinic anhydride by reacting first with elemental sulfur and then with a polyalkylene polyamine. The sulfur and nitrogen-containing products of this patent are said to possess corrosion inhibition properties, detergent-dispersant properties when of low molecular weight and, with higher molecular weight olefin polymers as the alkenyl substituent, may impart V.I improving properties. Also, U.S. Pat. No. 3,200,107 teaches a process for preparing a multifunctional additive of hydrocarbon compositions wherein an alkylene polyamine is reacted with carbon disulfide and with a hydrocarbon-substituted dicarboxylic acid or its anhydride. The preferred low molecular weight product contains both nitrogen and sulfur, and possesses antioxidant, detergent and corrosion-inhibiting properties, and when of high molecular weight possesses V.I. improving properties. However, none of these references suggests the direct thermal addition of a single sulfur-and nitrogen-containing compound onto a hydrocarbon compound.

The reaction of certain sulfur- and nitrogen-containing inorganic thiocyanate salts with alkenyl compounds to produce sulfur- and nitrogen-containing organic compounds which are useful as additives in hydrocarbon compositions is also known. For example, U.S. Pat. No. 4,303,539 teaches the preparation of thiocarbamyl derivatives from the reaction of previously prepared alkenyl isothiocyanates with amines, alcohols or thiols, these derivatives having utility as additives for fuels and lubricating oils for enhanced anticorrosion, oxidation inhibition and dispersancy activity Specific alkenyl isothiocyanate precursors include octadecenyl isothiocyanate, polyisobutenyl isothiocyanate, poly (ethylene-propylene-1,4-hexadiene) isothiocyanate, poly (ethylene-propylene-2,5-ethylidene norbornene) isothiocyanate, etc. However, this patent does not suggest the direct thermal addition of reactants with one or more reactive sulfur-to-nitrogen unsaturated sites to unsaturation in hydrocarbon compounds.

The cyclic addition of a sulfur monoimide at unsaturated sites in steroids for pharmaceutically useful compositions is disclosed in U.S. Pat. No. 4,342,754 which teaches the incorporation of N-sulfinyl carbamates with 17-alpha-alkylaminoethyl-17-alpha-hydroxysteroid to create steroid-spiro-oxathiazolidine derivatives having antimineral cortisoid effects. This cyclic addition does not involve hydrocarbon compositions exhibiting usefulness in polymers or oleaginous composition applications.

Thermal addition reactions of nitrogen and sulfur containing N-sulfinyl urethanes and sulfur diimides with alkadienes and alkenes have been the subject of discussion in some areas of the scientific literature. For example, in the Angew. Chem. Inter. Edition/Vol. 6 (1967)/No. 4 by H. H. Hoerhold, there is a description of the synthesis of N-sulfinyl urethanes, and mention of reactions in which a 1,4-addition of N-sulfinyl urethane occurs with norbornene and a cyclic addition occurs with 1,3-dienes; and in "Bis(methoxycarbonyl) Sulfur Diimide, a Convenient Reagent for the Allylic Amination of Alkenes," J. Org. Chem. (1983), pages 3561–3564, by G. Kresze and H. Munsterer, the synthesis of bis(methoxycarbonyl) sulfur diimide is described, as is its ene reaction with alkenes at ambient temperatures or below to form intermediate diamino sulfanes that can be further transformed into carbamates by treatment with hydroxides at room temperature. These cases, however, do not even discuss the potential utility of any of the products of these reactions, and they certainly do not suggest the reactions of these unsaturated sulfur- and nitrogen-containing compounds with oil soluble hydrocarbon compounds having ethylenic unsaturation to form products useful in polymeric or oleaginous composition applications.

SUMMARY OF THE INVENTION

In accordance with the present invention, it has now been discovered that nitrogen- and sulfur-containing hydrocarbon compounds having dispersancy-detergency and enhanced thermo-oxidative stability, and that hydrocarbon and polymeric compounds useful in connection with polymeric or oleaginous compositions can be obtained by incorporating by thermal addition sulfur mono- and diimides onto a carbon-to-carbon double bond which is present in a substantially saturated hydrocarbon backbone. In this manner the benefits of enhanced thermo-oxidative stability can be incorporated into a hydrocarbon or polymer compound, which, depending upon molecular weight, will also possess enhanced dispersant-detergent characteristics or combined dispersant-V.I. improving characteristics. All of this is now possible in view of the discovery of certain specified oil-soluble hydrocarbon and polymer compositions comprising adducts of sulfur mono- and/or diimides with olefinic hydrocarbons comprising substantially saturated hydrocarbon chains which include ethylenic unsaturation. In a particularly preferred application of the compositions of this invention, these novel multifunctional additives can be used in connection with both fuel and lubricating compositions.

Further, the reactivity of these sulfur mono- and diimides permits their addition to hydrocarbons and polymers having low levels of unsaturation under exceptionally mild conditions. Thus, problems arising from thermal addition reactions performed at high temperatures, typically 150° C. and higher, due to relatively unreactive adduct species, e.g., acrylonitrile, and from free radical grafting or copolymerization of maleic acid-/anhydride or nitrogen containing species, can be substantially minimized. Such problems as chain scission of the hydrocarbon backbone, cross-linking or other adverse bond rearrangement reactions, homopolymerization of unsaturated reactants, and undesirable side reactions with the solvent medium, all of which have been known, to varying degrees, to have resulted from high temperature thermal addition and free radical reactions, result in adverse changes in solubility and haze formation, gelling and phase separation in the formulation of lubricating oils, engine performance characteristics, and in polymer adduct molecular weight distribution ("MWD"). In contrast, practice of the present invention yields products exhibiting no discernible difference between adduct and backbone polymer molecular weight distribution. Furthermore, essentially no homopolymerization of sulfur mono- and diimides and no discernible trace of attached nitrogen or sulfur on saturated or aromatic reaction solvent molecules is observed. Similarly, little or no discernible adverse interaction with other commonly used V.I. improvers or dispersants has been observed.

Broadly, the novel class of hydrocarbon products of the present invention can be characterized as adducts of a sulfur monoimide or diimide with a substantially saturated hydrocarbon containing limited amounts of ethylenic unsaturation, preferably either hydrocarbon polymers or hydrocarbon monomers including at least eighteen carbon atoms. These hydrocarbon adducts comprise at least one adduct represented by the following formulae:

wherein R is a hydrocarbyl substituent having at least 18 carbon atoms; X= is selected from the group consisting of O=, S=, and Y'—N=; i is an integer selected from the group consisting of 1 or 0; Y and Y' independently comprise at least one substituted electron-withdrawing group selected from the group consisting of:

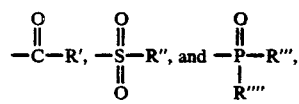

wherein R' is hydrocarbyl or hydrocarbyloxy; R" is hydrocarbyl; and R''' and R'''' are independently selected from hydrocarbyloxy; with the further proviso that R', R", R''', and R'''' each comprise from 1 to about 20 carbon atoms.

In preferred forms, the hydrocarbon and/or polymer products of this invention are oil-soluble hydrocarbon adducts exhibiting significantly enhanced dispersancy and thermo-oxidative stability characteristics for lubricating oil compositions, detergent and fuel stability characteristics for fuel compositions, and additionally, when of higher molecular weight, V.I. improving properties.

DETAILED DESCRIPTION

The olefinic hydrocarbons and polymers with which the sulfur mono- and diimides of the present invention are to be reacted are well known in the art. These oil soluble olefinic compounds comprise substantially saturated hydrocarbon backbones, which cause them to be relatively inert to ozone attack and oxidative degradation, yet they also have a minor amount of ethylenic unsaturation which is available for adduct formation by means of the thermal addition processes. Thus the radical should preferably be substantially saturated, i.e., at least about 92% of the total number of carbon-to-carbon covalent linkages are saturated linkages. An excessive proportion of unsaturated linkages or bonds renders the molecule susceptible to oxidation, degradation, and polymerization, and results in products which are unsuitable for use in hydrocarbon oils in many applications.

The terms "hydrocarbon" and "hydrocarbyl" (and the cognate term "hydrocarbyloxy") are herein to include substantially hydrocarbon compounds and hydrocarbyl groups (and substantially hydrocarbyloxy) as well as purely hydrocarbyl groups. The description of these groups as being substantially hydrocarbon or hydrocarbyl means that they contain no non-hydrocarbyl substituents or non-carbon atoms which significantly affect the hydrocarbyl characteristics or properties of such compounds and groups relevant to their uses as described herein. For example, in the context of this invention, a purely hydrocarbyl $C_{40}$ alkyl group and a $C_{40}$ alkyl group substituted with a methoxy substituent are substantially similar in their properties with regard to their use in this invention and would be hydrocarbyl.

Non-limiting examples of substituents and constituents which do not significantly alter the hydrocarbyl characteristics or properties of the general nature of the hydrocarbon compounds and hydrocarbyl groups of this invention are the following:

Ether groups (especially hydrocarbyloxy such as phenoxy, benzyloxy, methoxy, n-butoxy, etc., and particularly alkoxy groups of up to ten carbon atoms);

Oxa groups (e.g., —O— linkages in the main carbon chain);

Nitro groups;

Thioether groups (especially $C_{1-10}$ alkyl thioether);

Thio groups (e.g., —S— linkages in the main carbon chain);

Carbohydrocarbyloxy groups (e.g., 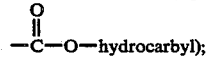

Sulfonyl groups (e.g., 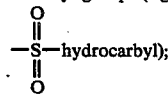

Sulfinyl groups (e.g., 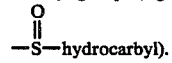

This list is intended to be merely illustrative and not exhaustive, and the omission of a certain class of substituent is not meant to require its exclusion. In general, if such substituents are present, there will not be more than two for each ten carbon atoms in the substantially hydrocarbyl group and preferably not more than one for each ten carbon atoms since this number of substituents usually will not substantially affect the hydrocarbyl characteristics and properties of the group. Nevertheless, the hydrocarbyl groups usually will be free from non-hydrocarbon groups due to economic considerations; that is, they will be purely hydrocarbyl groups consisting of only carbon and hydrogen atoms.

The olefinic hydrocarbon compounds which can be utilized in connection with this invention will typically be long-chain hydrocarbyl compounds consisting of at least 18 carbon atoms, so as to provide acceptable oil-solubility. A critical aspect of this invention is thus the size of these hydrocarbyl compounds. Thus, only those hydrocarbyl compounds having at least about 18 carbon atoms are contemplated as being within the scope of this invention. Furthermore, in the case of hydrocarbon compounds having two or more polar groups in a molecule, the hydrocarbyl compound must contain about 10 to 18 aliphatic carbon atoms per each such polar group. This lower limit is based principally upon consideration of the oil-solubility of the olefinic hydrocarbon adducts, as well as their effectiveness as additives in hydrocarbon compounds for the purposes of this invention.

The ethylenic unsaturation in these olefinic hydrocarbons will either be (1) terminal, that is, appearing at a position no more than three carbon atom positions from one end of a hydrocarbon compound; (2) internal, that is, in the principal or main chain of a hydrocarbon compound and more than about three carbon atom positions from one end of that hydrocarbon compound; or (3) pendant, that is, appearing in a hydrocarbyl branch or substituent off of the main chain of that hydrocarbyl compound, whether internal or external to cyclic hydrocarbyl groupings within or external to the main chain of the hydrocarbon compound. Non-limiting examples of terminal, internal and pendant ethylenic unsaturation are illustrated below, where the zig-zag line represents the principal portion of the hydrocarbon compound and the allylic fragment containing the ethylenic unsaturation is specifically depicted.

| Pendant Unsaturation | |
|---|---|
| 5-Alkylidene-2-norbornene Unit in hydrocarbon compound | 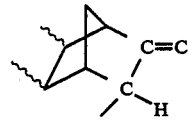 |
| 1,4-Hexadiene Unit in hydrocarbon compound | 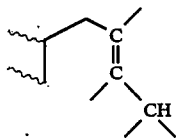 |
| Terminal Unsaturation | 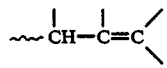 |
| Internal Unsaturation | 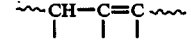 |

Specific examples of suitable oil soluble hydrocarbon compounds having particular utility as fuel additives include $C_{18}$ to $C_{40}$, and preferably $C_{18}$ to $C_{30}$ olefins, including both alpha-olefins and internal olefins, which may be straight or branched In one preferred embodiment, these will be $C_{18}$ to $C_{30}$ olefins, and examples of same include octadecene, eicosene and octacosene. These will preferably comprise hydrocarbons including between about 1 and 4 double bonds, and preferably between about 1 and 3 double bonds.

Specific examples of suitable oligomers include oligomers of $C_3$ to $C_{12}$ olefins, preferably of $C_3$ to $C_8$ olefins, again including both alpha-olefins and internal olefins. These preferably include from 2 to 8 repeating units, such as pentaisobutylene and octapropylene, and trimers of alpha-olefins, e.g., 1-decene.

The oil soluble olefinic polymers which can be utilized in connection with this invention will generally have a number average molecular weight ($\overline{M_n}$) of at least about 500, and probably from about 500 to 1,000,000, and generally from about 700 to about 5,000, and more preferably from about 800 to about 3,000 for dispersant and detergent applications, and from about 5,000 to about 1,000,000, such as from about 10,000 to about 500,000 or up to about 1,000,000, and generally from about 20,000 to about 1,000,000 (i.e., about 40,000 to about 500,000), and most generally from about 20,000 to about 400,000 (i.e., about 40,000 to about 200,000), for V.I. improver-dispersant applications. For these V.I. improver-dispersant applications, polymers useful as V.I. improvers will be used. These V.I. improvers will generally have a narrow range of molecular weight, as determined by the ratio of weight average molecular weight ($\overline{M_w}$) to number average molecular weight ($\overline{M_w}$). Polymers having a $\overline{M_w}/\overline{M_n}$ of less than 10, preferably less than 7, and more preferably 4 or less are most desirable As used herein ($\overline{M_n}$) and ($\overline{M_w}$) are measured by the well known techniques of vapor phase osmometry (VPO), membrane osmometry and gel permeation chromotography. Polymers in this range may be obtained by a choice of synthesis conditions, and/or by choice of principal catalyst and co-catalyst combination, and the addition of hydrogen during the synthesis. Post synthesis treatment such as extrusion at elevated temperatures and under high shear through small orifices, and fractional precipitation from solution may also be used to obtain narrow ranges of desired molecular weights. For a comprehensive review of the art reference is made to "Polymer Chemistry of Synthetic Elastomers," edited by Kennedy and Tornqvist, Interscience, New York 1969, which is incorporated herein by reference thereto. Alternatively, polymers within the most desirable range can be made by direct polymerization in accordance with the teachings of U.S. Pat. No. 4,540,753, entitled "Narrow MWD Alpha-Olefin Copolymers," which is also incorporated herein by reference thereto.

The olefinic polymers useful in this invention may be essentially amorphous in character, including those with up to about 25 percent by weight of crystalline segments as determined by x-ray or differential scanning calorimetry. Details of these methods for measurement of crystallinity are found in J. Polymer Sci. A.2,9,127 (1971) by G. VerStrate and Z. W. Wilchinsky. Additionally, the polymers may be of any of the tapered or block copolymers known in the prior art, or the copolymers of alpha-olefins comprised of chains of intramolecularly heterogeneous and intermolecularly homogeneous monomer units, such as those prepared by a process of the aforementioned U.S. Pat. No. 4,540,753.

Specific examples of suitable hydrocarbon polymers include homopolymers and copolymers of one or more monomers of $C_2$ to $C_{30}$, e.g., $C_2$ to $C_8$ olefins, including both alpha-olefins and internal olefins, which may be straight or branched, aliphatic, aromatic, alkylaromatic, and cycloaliphatic. In one preferred embodiment, these will be polymers of ethylene with $C_3$ to $C_{30}$ olefins, preferably copolymers of ethylene and propylene. Examples of polymers of other olefins include polymers of ethylene or polymers of propylene which contain nonconjugated diolefins, such as hexadiene. Also included are polymers of butene, isobutylene, polymers and copolymers of $C_6$ and higher alpha-olefins, particularly useful examples being polybutenes, polyisobutylenes, copolymers of propylene and isobutylene, copolymers of isobutylene and butadiene, and the like.

Other suitable hydrocarbon polymers containing olefinic unsaturation well known in the art include those which may be described a hydrogenated or partially hydrogenated homopolymers, and random, tapered, or block polymers (copolymers, including terpolymers, tetrapolymers, etc.) of conjugated dienes and/or monovinyl aromatic compounds with, optionally, alpha-olefins or lower alkenes, e.g., $C_3$ to $C_{18}$ alpha-olefins or lower alkenes. The conjugated dienes include isoprene, butadiene, 2,3-dimethylbutadiene, piperylene and/or mixtures thereof, such as isoprene and butadiene. The monovinyl aromatic compounds include any of the following, or mixtures thereof, vinyl di- or polyaromatic compounds, e.g., vinyl naphthalene, but are preferably monovinyl monoaromatic compounds, such as styrene or alkylated styrenes substituted at the alpha-carbon atoms of the styrene, such as alpha-methylstyrene, or at ring carbons, such as o-, m-, p-methylstyrene, ethylstyrene, propylstyrene, isopropylstyrene, butylstyrene, isobutylstyrene, tert-butylstyrene (e.g., p-tert-butylstyrene). Also included are vinylxylenes, methylethyl styrenes, and ethylvinylstyrenes. Alpha-olefins and lower alkenes optionally included in these random, tapered and block copolymers preferably include ethylene, propylene, butene, ethylene-propylene copolymers, isobutylene, and polymers and copolymers thereof. As is also known in the art, these random, tapered and block copolymers may include relatively small amounts, that is less than about 5 mole %, of other copolymerizable monomers such as vinyl pyridines, vinyl lactams, methacrylates, vinyl chloride, vinylidene chloride, vinyl acetate, vinyl stearate, and the like. Specific examples include random polymers of butadiene and/or isoprene and polymers of isoprene and/or butadiene and styrene. Typical block copolymers include polystyrene-polyisoprene, polystyrene-polybutadiene, polystyrene-polyethylene, polystyrene-ethylene propylene copolymer, polyvinyl cyclohexane-hydrogenated polyisoprene, and polyvinyl cyclohexane-hydrogenated polybutadiene. Tapered polymers include those of the foregoing monomers prepared by methods known in the art.

The preferred polymers for use in connection herewith are prepared from ethylene and ethylenically unsaturated hydrocarbons including cyclic, alicyclic and acyclic materials containing from 3 to 28 carbon atoms, e.g., 2 to 18 carbon atoms. These ethylene copolymers may on average contain from an average of 15 to 90 wt. % ethylene, preferably about an average of 30 to 80 wt. % of ethylene, and about an average of 10 to 85 wt. %, and preferably about an average of 20 to 70 wt. % of one or more $C_3$ to $C_8$, alpha-olefins. Copolymers of ethylene and propylene are most preferred. Other alpha-olefins suitable in place of propylene to form the copolymer, or to be used in combination with ethylene and propylene so as to form terpolymers, tetrapolymers, etc., include 1-butene, 1-penteneyl-hexene, 1-heptene,1-octene, 1-nonene,1-decene, etc.; also branched chain alpha-olefins, such as 4-methyl-1-pentene, 4-methylhexene-1, 5-methylpentene-1, 4,4-dimethyl-pentene-1, and 6-methylheptene-1, and mixtures thereof.

Additionally preferred polymers, particularly for use in accordance with this invention as additives with effective dispersancy properties, are homopolymers and copolymers of isobutylene with one or more $C_2$ to $C_{10}$, e.g., $C_2$ to $C_5$, monoolefins. Examples of such olefins are ethylene, propylene, butylene, pentene, octene-1, styrene, etc. Non-limiting examples of such copolymers include those of butylene and isobutylene, propylene and isobutylene, etc. These polymers will usually have number average molecular weights within the range of from about 700 to about 5,000, more particularly between about 800 and about 3,000. Particularly useful olefin polymers have number average molecular weights within the range of from about 1,500 to about 5,000, particularly between about 1,600 and about 3,000, and more particularly between about 1,500 and about 2,500, with approximately one terminal double bond per polymer chain. The number average molecular weight for such polymers can be determined by several known techniques. A convenient method for such determination is by gel permeation chromatography (GPC) which additionally provides molecular weight distribution information, as set forth by W. W. Yau, J. J. Kirkland and D. D. Bly, in "Modern Size Exclusion Liquid Chromatography," John Wiley and Sons, New York, 1979, which is incorporated herein by reference thereto.

The term copolymer as used herein, unless otherwise indicated, is thus meant to include terpolymers, tetrapolymers, etc. of ethylene, $C_3$ to $C_{28}$ alpha-olefins and/or non-conjugated diolefins, or mixtures of such diolefins, and of isobutylene with $C_4$ to $C_{18}$ non-conjugated diolefins, or mixtures of such diolefins. The amount of non-conjugated diolefin will generally range from about 0.5 to 20 mole percent, and preferably from about 1 to about 10 mole percent, based on the total amount of ethylene and alpha-olefin present.

Representative examples of non-conjugated dienes that may be used in these polymers include:

a. Straight chain acyclic dienes such as: 1,4-hexadiene; 1,5-heptadiene; 1,6-octadiene.
b. Branched chain acyclic dienes such as: 5-methyl-1,4-hexadiene; 3,7-dimethyl 1,6-octadiene; 3,7-dimethyl 1,7-octadiene; and the mixed isomers of dihydro-myrcene and dihydro-cymene.
c. Single ring alicyclic dienes such as: 1,4-cyclohexadiene; 1,5-cyclooctadiene; 1,5-cyclododecadiene; 4-vinylcyclohexene; 1-allyl, 4-isopropylidene cyclohexane; 3-allyl-cyclopentene; 4-allyl cyclohexene; and 1-isopropenyl-4-butenyl cyclohexane
d. Multi-single ring alicyclic dienes such as: 4,4'-dicyclopentenyl and 4,4'-dicyclohexenyl dienes.
e. Multi ring alicyclic fused and bridged ring dienes such as: tetrahydroindene; methyl tetrahydroindene; dicyclopentadiene; bicyclo (2.2.1) hepta 2,5-diene; alkyl, alkenyl, alkylidene,cycloalkenyl and cycloalkylidene norbornenes such as: ethyl norbornene; 5-methylene-6-methyl-2-nobornene; 5-methylene-6, 6-dimethyl-2-norbornene; 5-propenyl-2-norbornene; 5-(3-cyclopentenyl)-2-norbornene; 5-ethylidene-2-norbornene; and 5-cyclohexylidene-2-norbornene; norbornadiene; etc.

SULFUR MONO- AND DIIMIDES

The sulfur mono- or diimides used to form the adducts of the present invention are, generally speaking, unsaturated, polar, nitrogen- and sulfur-containing organic reactants. They will generally include carbon, hydrogen, nitrogen, sulfur, and oxygen, and will contain at least one sulfur atom double-bonded to at least one nitrogen atom, and must also contain an electron withdrawing group in sufficient proximity to the nitrogen-sulfur double-bond such that at least one nitrogen-sulfur double bond is activated towards reaction with the olefinic unsaturation in the hydrocarbon monomer or polymer.

The preferred unsaturated, polar nitrogen- and sulfur-containing reactants to which the present invention is directed are heterocumulenes having the formula:

wherein $X=$ is $O=$, $S=$, or $Y'-N=$, and in which $-Y$ and $Y'-$ are the same or different and comprise electron withdrawing groups having a substituent group, such as substituted carbonyls, $-C(O)R'$, substituted sulfonyls, $-S(O_2)R''$, substituted phosphoryls, $-P(O)(R''')(R'''')$, represented by:

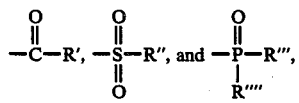

wherein $R'$ is selected from the group consisting of hydrocarbyl and hydrocarbyloxy, $R''$ is hydrocarbyl, and $R'''$ and $R''''$ are independently hydrocarbyloxy, and each of $R'$, $R''$, $R'''$, and $R''''$ includes from 1 to 20 carbon atoms. The exact constituency and structure of $R'$, $R''$, $R'''$, or $R''''$ is not critical to the invention, and any constituent structure thereof which does not create steric hindrance, and which does not decrease the electron withdrawing properties of the $-Y$ and $Y'$-groups sufficiently to prevent the reaction with the double bond will be effective for this invention.

Thus, the substituent $R'$ or $R''$ can be any substituted or non-substituted aliphatic (linear or branched), aromatic, cycloaliphatic, or heterocyclic group, and although the substituent group will normally be saturated, some non-ethylenic unsaturation may be tolerated, for example, 1 to 2 unsaturated bonds per substituent group. Such unsaturation will be one or more of carbon to hetero-atom or hetero-atom to hetero-atom bonds, for example, ketoic, carboxylic, thioic, sulfonic, sulfuric, imidic, etc.

Aliphatic substituent groups can include the straight or branched alkyl chains such as methyl, ethyl, nonyl, octadecyl, and the like. Examples of such groups include 2-ethyl-hexyl, 2,2,4-trimethyl pentyl, 2,6,10,14-tetramethyl pentadecyl, etc. Specific examples of the sulfur imides include N,N'-diacetyl sulfur diimide, N,N'-di(methyl sulfonyl) sulfur diimide, N,N'-dibutyryl sulfur diimide, N,N'-di(butyl sulfonyl) sulfur diimide, N,N'-di(2-ethyl-hexanoyl) sulfur diimide, N,N'-di(2-ethyl-hexyl sulfonyl) sulfur diimide, N,N'-di-octadecanoyl sulfur diimide, N,N'-di(octadecyl sulfonyl) sulfur diimide, and the equivalent mono- and unsymmetrically substituted mono- and diimides.

Aromatic substituents, which may be heteroatom-containing (e.g., nitrogen) aromatic substituents, include those having one or more hydrocarbyl or heteroatom-containing hydrocarbyl groups substituted for a hydrogen attached to a ring carbon. Such substitution can be at one or more of the ortho, meta or para positions. Specific examples of such substituents include phenyl, tolyl, xylyl, 2,4,6-trimethyl pyridyl, 2(4-butyl) pyridyl, and 2(4-decyl) pyridyl. Specific such compounds include N,N'-dibenzoyl sulfur diimide, bis nicotinoyl sulfur diimide, N-sulfinyl benzamide, N-sulfinyl-p-toluene sulfonamide, N,N'-bis-p-toluene sulfonyl sulfur diimide, N,N'-bis(4-hexadecyl phenyl sulfonyl) sulfur diimide, and N,N'-bis(4-octadecyl benzoyl) sulfur diimide. Again, the sulfur diimides may be unsymmetrically substituted with any of the radicals listed above. Such an unsymmetrical sulfur diimide is exemplified by N-benzoyl-N'-carbethoxy sulfur diimide.

Particularly useful examples of the —R', —R''' and —R'''' group include hydrocarbyloxy groups, such as aliphatic groups having an —O— atom attached directly to the electron-withdrawing group —C(O)—, i.e., alkoxy substituents. Specific examples of compounds so comprised include N-sulfinyl methyl carbamate, N-sulfinyl-2-ethylhexyl carbamate, N-sulfinyl-N-octadecyl carbamate, N,N-dicarbethoxy sulfur diimide, N,N'-biscarbodecyloxy sulfur diimide, N,N'-biscarboctadecyloxy sulfur diimide, N,N'-biscarbo-2-ethyldecyloxy sulfur diimide, or any mono- or dicarboalkoxy sulfur diimide where the mono- or dicarboalkoxy groups contain one to about 18 carbon atoms. The sulfur diimides may contain one hydrocarbyloxy substituent as well as a different hydrocarbyloxy or another of the above-described substituents, e.g., N-nicotinoyl-N'-carboctadecyloxy sulfur diimide. The dialkyl phosphoro (sulfinyl amidates) such as diethyl phosphoro (sulfinyl amidate) are another specific group of compounds having hydrocarbyloxy substituents and thus having utility in accordance with this invention.

Aryloxy —R', R''' and R'''' substituents include the aromatic substituents described above attached to the —O— atom which is directly attached to the carbon atom of the electron-withdrawing group —C(O)—. Specific examples of these compounds include N-sulfinyl-phenyl carbamate, N-sulfinyl-4-butyl phenyl carbamate, N-sulfinyl-3-pyridylcarbamate, bis(carbophenoxy) sulfur diimide, bis (carbo-4-octadecyl phenoxy) sulfur diimide, bis (carbo-4-heptyl-2-pyridyloxy) sulfur diimide, and compounds produced by the unsymmetrical substitution on the sulfur diimide radical of these substituents, or mixed with those substituents in the preceding paragraphs.

PREPARATION OF SULFUR MONO- AND DIIMIDES

It is well known in the art that the various sulfur mono- and diimides can be produced by means of the procedures as described in the articles by Messrs. Kresze and Munsterer and by Hoerhold mentioned in the Background section of this specification, and the disclosure of which is incorporated herein by reference thereto. In a general sense, the sulfur monoimides of this invention can be prepared by treating N-chloroiminocarbonic esters with thionyl chloride. The sulfur diimides can be prepared by treating an N,N-dichlorocarbamate with sulfur dichloride, generally at about 50° to 60° C. An alternative method, as shown in examples 1-3 of this application, involves reacting a carbamate or aroylamide with thionyl chloride in the presence of pyridine, benzene, toluene or other non-protic solvents.

Similarly, sulfonamides give the corresponding sulfonyl sulfur mono- or diimides when reacted with thionyl chloride in the presence of a non-protic base, e.g., pyridine, generally at about 50° to 60° C., all as known in the art. Furthermore, the dialkyl phosphoroamidates give the corresponding phosphoryl sulfur mono- or diimides, when reacted with thionyl chloride in the presence of benzene or other such non-protic solvents, with the mixture being slowly heated at about 50° to 80° C. In each of these cases the production of the diimide will be favored by continued heating and stirring at reaction temperatures. In preparing the unsymmetrical sulfur diimides a sulfur diimide formed as above is treated with a 1 molar equivalent of an aroyl amide in the presence of a base catalyst. Utilizing this general procedure the desired sulfur mono- or diimide can be formed, and the more reactive functional groups substituted for those less reactive groups in the desired manner. By "more reactive" in this context is meant a greater degree of basicity as determined by pKb measurement.

DESCRIPTION OF THE OLEFINIC HYDROCARBON ADDUCT

The preparation of the products of the present invention from the aforementioned olefinic hydrocarbon compounds and sulfur mono- or diimides is carried out by means of a thermal addition reaction. The exact means or mechanism of this addition reaction is not important with respect to the purposes of this invention, so long as the sulfur imides become chemically bound to the olefinic hydrocarbons contemplated herein. The variety of locations, and thus properties, of the ethylenic unsaturation in the olefinic hydrocarbon compounds, as well as the varying reactive properties of the sulfur imide compounds, are believed to lead to different mechanisms of the thermal addition reaction. Those mechanisms are theorized to be encompassed within the following description, although applicants do not wish to be bound by same.

The electron-poor sulfur atom of the sulfur imide is believed to be drawn to the electron-rich ethylenic unsaturation in the olefinic hydrocarbon and, at least initially, forms a single C-S, or sigma bond, with one of the double-bonded carbon atoms constituting that ethylenic unsaturation. A consequent allylic shift of the double bond may then occur, which is accompanied by a shift of an allylic hydrogen to the sulfur imide. This reaction is an "ene" reaction, and results in a final product represented by (A) in FIG. I.

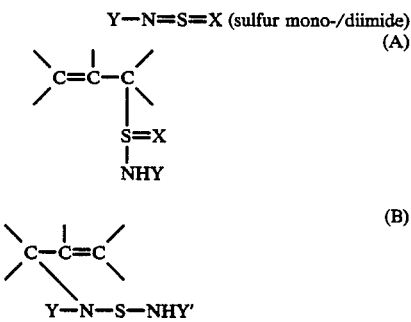

FIG. I

Another product of this "ene" reaction, when the sulfur imide is a diimide, is that represented by (B) in FIG. I, which may occur as the result of a sigmatropic rearrangement of the C—S bond to a C—N bond. Where the sulfur imide is a monoimide, that is where X is O or S, it is further theorized that a similar sigmatropic rearrangement may occur. It is believed that this product is transient, and will fragment by breakage of the N—S bond, resulting in retention by the hydrocarbon adduct of the nitrogen-containing group and loss of a sulfur-containing group, represented by (D) in FIG. II:

FIG. II

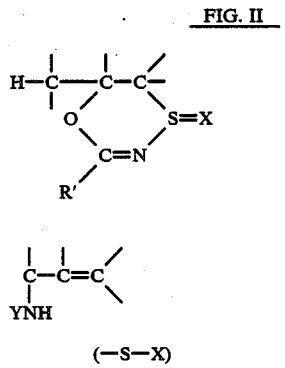

(C)

(D)

(—S—X)

A similar fragmentation is believed to occur to a minor extent for the sulfur diimide adducts in the event of impurity (e.g., catalytic reagents, water, other N- or S- containing impurities, free radical groups, etc.) in the reaction solvent or mix. The nitrogen-containing group continues to contribute dispersant properties to this resulting hydrocarbon adduct while the separated sulfur-containing group will form low molecular weight products that can be stripped off or retained in solution. If retained, the sulfur-containing compounds will contribute anti-oxidant properties to the finally formulated compositions, as is known in the art.

Additionally, where Y or Y' is

the intermediate leading to the product represented by (A) in FIG. I, that is after the C—S bond has commenced forming but prior to any allylic shifts, may collapse to the product represented by (C) in FIG. II, which represents a Diels-Alder addition where both the S and a carbonyl O from a substituted carbonyl electron-withdrawing group, where such is present in the selected sulfur imide, form sigma bonds with the double-bonded carbon atoms constituting the ethylenic unsaturation. Where the sulfur diimide is unsymmetrically substituted, mixtures of regioisomers may occur by the same mechanisms represented above. Such regioisomers, though not illustrated here, are within the scope of this invention.

The addition product portion of the final hydrocarbon adduct of this invention will then be presented by one of (A), (B), (C), or (D) in FIGS. I and II, and regioisomers, or a combination thereof. The hydrocarbon adducts of this invention, corresponding to the above figures, thus comprise at least one adduct represented by the following formulae:

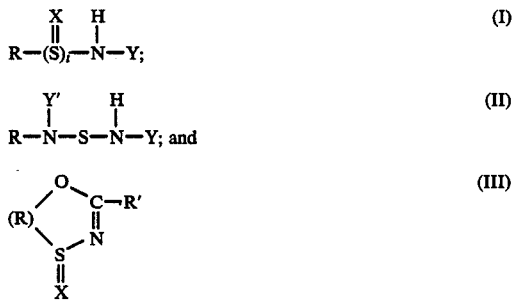

wherein R is a hydrocarbyl substituent having at least 18 carbon atoms; X= is selected from the group consisting of O=, S=, and Y'—N=; i is an integer selected from the group consisting of 1 or 0; Y and Y' independently comprise at least one substituted electron-withdrawing group selected from the group consisting of:

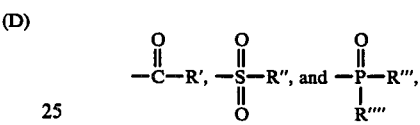

wherein R' is hydrocarbyl or hydrocarbyloxy; R'' is hydrocarbyl; and R''' and R'''' are independently selected from hydrocarbyloxy; with the further provision that R', R'', R''', and R'''' each comprise from 1 to about 20 carbon atoms.

The olefinic hydrocarbon adducts of the present invention can thus be prepared by various processes in which the olefinic hydrocarbon compounds, including the olefinic polymers hereof, and the sulfur mono- or diimide are intimately intermixed and concurrently or subsequently heated to a temperature at which such thermal addition occurs, again without the appreciable generation of free radicals or decomposition. This, of course, is possible in accordance with the present invention because of the high reactivity of the particular claimed sulfur mono- and diimides of this invention, by which free radical chemistry is not employed in connection with the formation of the adduct hereof. Reaction temperatures are generally within the range of from 0° C. to 160° C., preferably from 25° C. to 150° C., and more preferably from 50° C. to 150° C. The particular preferred temperature range will vary depending upon the particular olefinic hydrocarbon compounds or polymers and sulfur mono- or diimides employed. However, in order to shorten reaction times, higher temperatures, up to 180° C. and higher, are feasible, but these temperatures must not exceed the decomposition temperatures for the specific mono- or diimide monomers being added thereto. In any event, mixing of the olefinic polymer and imide reactants can be obtained by blending these reactants together, preferably with a solvent, in an internal mixer, such as a stirred tank, masticator or the like, or extruder. Although this process has been illustrated in terms of dissolving the olefinic hydrocarbon compounds and imide reactants in a solvent, it is also possible to operate the process in the substantial absence of a solvent if the hydrocarbon compound and imide reactant mixture have sufficiently low melt viscosities for effective admixture and thermal addition at the reaction temperature involved. It will thus be obvious to those skilled in the art that any means of mixing the olefinic polymers and the imide reactants can produce the products of this invention.

Thus, in a preferred process in accordance with the present invention, the hydrocarbon compounds or polymers are dissolved in a solvent such as benzene, heptane, cyclohexane, synthetic oil or mineral oil, and the imide reactant is then introduced into this solution. The solution can then be heated to temperatures of between 25° C. and 150° C. for several hours in the substantial absence of air or oxygen, thus preferably under a blanket of inert gas, such as nitrogen. Furthermore, it is important that the process be performed under substantially anhydrous conditions. Each water molecule present in the reactor may act as a poison with respect to each equivalent molecule of the mono- or diimide present therein, thus preventing its addition to the hydrocarbon monomer or polymer present therein and reducing the overall efficiency of the process. The product may be subsequently separated from the reaction mixture by stripping off the reaction solvent, and the mono- or diimide monomer where that monomer is sufficiently volatile. Where they are insufficiently volatile for such purpose, separation can be achieved by precipitating the polymer product by the addition of a low molecular weight polar solvent which is miscible with the reaction solution, such as acetone, methanol, isopropanol and the like.

When the process is conducted either without solvent or in a synthetic or mineral oil which has been chosen for its effectiveness in the finally formulated lubricating oil composition, then no separation will be necessary. Instead, the hydrocarbon or polymer adduct, either essentially pure in the case where the process has been conducted without solvent, or in the oil utilized as a solvent, can then be packaged in that condition, or further diluted with appropriate lubricating oil packages for desired intermediate or end use purposes.

The proportions in which the imide reactants of the present invention are to be used can vary according to the particular olefinic hydrocarbon employed, but normally will range between 0.01 and 3, and preferably between about 0.1 and 1.5 mole of the imide reactant per mole of the ethylenic unsaturation in the polymer. The degree of ethylenic unsaturation of the polymer is measured by several methods which are known to those of ordinary skill in this art, among which are included nuclear magnetic resonance (NMR), calibrated infrared spectroscopy, refractive index comparisons (particularly for ethylene-propylene-norbornene terpolymers), and calibrated iodine titration measurements.

The adducts formed from the above hydrocarbon monomers and polymers and the sulfur mono- and diimides will contain between about 0.05 and 15 wt. % nitrogen, and preferably between about 0.1 and 7 wt % nitrogen, and between about 0.05 and 32 wt. % sulfur, preferably between about 0.1 and 16 wt. % sulfur. More particularly, the specific amounts of nitrogen and sulfur most desired in a given situation will depend both upon the ultimate use intended for the selected adduct, and upon the specific monomer or polymer with which it is adducted. Furthermore, with intended end uses as multifunctional V.I. improvers, between about 0.1 and 0.8 wt. % nitrogen will be desired, while in the case of desired dispersant utilization, between about 0.1 and 7 wt. % nitrogen will be most preferred.

ADDITIVE USAGE

The adducts produced in accordance with the present invention have been found to be particularly useful as fuel and lubricating oil additives.

When the adduct compositions of this invention are used in normally liquid petroleum fuels, such as middle distillates boiling from about 150° to 800° F., including kerosene, diesel fuels, home heating fuel oil, jet fuels, etc., a concentration of the additive in the fuel in the range of typically from 0.001 wt. % to 0.5 wt. %, preferably 0.005 wt. % to 0.2 wt %, based on the total weight of the composition, will usually be employed. These adducts can contribute fuel stability as well as dispersant activity and/or varnish control behavior to the fuel.

The adducts of this invention, and particularly the polymer adducts hereof, find their primary utility, however, in lubricating oil compositions, which employ a base oil in which the additives are dissolved or dispersed. Such base oils may be natural or synthetic.

Thus, base oils suitable for use in preparing the lubricating compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Thus, the additives of the present invention may be suitably incorporated into synthetic base oils such as alkyl esters of dicarboxylic acids, polyglycols and alcohols; polyalpha-olefins, polybutenes, alkyl benzenes, organic esters of phosphoric acids, polysilicone oils, etc.

Natural base oils include mineral lubricating oils which may vary widely as to their crude source, e.g., whether paraffinic, naphthenic, mixed, paraffinicnaphthenic, and the like; as well as to their formation, e.g., distillation range, straight run or cracked, hydrofined, solvent extracted and the like.

More specifically, the natural lubricating oil base stocks which can be used in the compositions of this invention may be straight mineral lubricating oil or distillates derived from paraffinic, naphthenic, asphaltic, or mixed base crudes, or, if desired, various blends oils may be employed as well as residuals, particularly those from which asphaltic constituents have been removed. The oils may be refined by conventional methods using acid, alkali, and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, etc.

The lubricating oil base stock conveniently has a viscosity of typically about 2.5 to about 12, and preferably about 2.5 to about 9 cSt. at 100° C.

Thus, the additives of the present invention can be employed in a lubricating oil composition which comprises lubricating oil, typically in a major amount, and the additive, typically in a minor amount, which is effective to impart enhanced dispersancy and/or V.I. improvement relative to the absence of the additive. Additional conventional additives selected to meet the particular requirements of a selected type of lubricating oil composition can be included as desired.

The additives of this invention are oil-soluble, dissolvable in oil with the aid of a suitable solvent, or are stably dispersible materials. Oil-soluble, dissolvable, or stably dispersible as that terminology is used herein does not necessarily indicate that the materials are soluble, dissolvable, miscible, or capable of being suspended in oil in all proportions. It does mean, however, that the additives, for instance, are soluble or stably dispersible in oil to an extent sufficient to exert their intended effect in the environment in which the oil is employed. Moreover, the additional incorporation of other additives may also permit incorporation of higher levels of a particular polymer adduct hereof, if desired.

Accordingly, while any effective amount of these additives can be incorporated into the fully formulated lubricating oil composition, it is contemplated that such effective amount be sufficient to provide said lube oil composition with an amount of the additive of typically from 0.01 to about 10, e.g., 0.1 to 6.0, and preferably from 0.25 to 3.0 wt. %, based on the weight of said composition.

The additives of the present invention can be incorporated into the lubricating oil in any convenient way. Thus, they can be added directly to the oil by dispersing, or dissolving the same in the oil at the desired level of concentration, typically with the aid of a suitable solvent such as toluene, cyclohexane, or tetrahydrofuran. Such blending can occur at room temperature or elevated temperatures. In this form the additive per se is thus being utilized as a 100% active ingredient form which can be added to the oil or fuel formulation by the purchaser. Alternatively, these additives may be blended with a suitable oil-soluble solvent and base oil to form a concentrate, which may then be blended with a lubricating oil base stock to obtain the final formulation. Concentrates will typically contain from about 2 to 80 wt. %, by weight of the additive, and preferably from about 5 to 40% by weight of the additive.

The lubricating oil base stock for the additives of the present invention typically is adapted to perform a selected function by the incorporation of additives therein to form lubricating oil compositions (i.e., formulations).

Representative additives typically present in such formulations include viscosity modifiers, corrosion inhibitors, oxidation inhibitors, friction modifiers, other dispersants, anti-foaming agents, anti-wear agents, pour point depressants, detergents, rust inhibitors and the like.

Viscosity modifiers impart high and low temperature operability to the lubricating oil and permit it to remain shear stable at elevated temperatures and also exhibit acceptable viscosity or fluidity at low temperatures. These viscosity modifiers are generally high molecular weight hydrocarbon polymers including polyesters. The viscosity modifiers may also be derivatized to include other properties or functions, such as the addition of dispersancy properties.

These oil soluble viscosity modifying polymers will generally have weight average molecular weights of from about 10,000 to 1,000,000, preferably 20,000 to 500,000, as determined by gel permeation chromatography or light scattering methods.

Representative examples of suitable viscosity modifiers are any of the types known to the art including polyisobutylene, copolymers of ethylene and propylene, polymethacrylates, methacrylate copolymers, copolymers of an unsaturated dicarboxylic acid and vinyl compound, interpolymers of styrene and acrylic esters, and partially hydrogenated copolymers of styrene/isoprene, styrene/butadiene, and isoprene/butadiene, as well as the partially hydrogenated homopolymers of butadiene and isoprene.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 wt. % of a sulfide of phosphorus for ½ to 15 hours, at a temperature in the range of about 66 to about 316° C. Neutralization of the phosphosulfurized hydrocarbon may be effected in the manner taught in U.S. Pat. No. 1,969,324.

Oxidation inhibitors, or antioxidants, reduce the tendency of mineral oils to deteriorate in service which deterioration can be evidenced by the products of oxidation such as sludge and varnish-like deposits on the metal surfaces, and by viscosity growth. Such oxidation inhibitors include alkaline earth metal salts of alkylphenolthioesters having preferably $C_5$ to $C_{12}$ alkyl side chains, e.g., calcium nonylphenol sulfide, barium t-octylphenyl sulfide, dioctylphenylamine, phenylalphanaphthylamine, phospho- sulfurized or sulfurized hydrocarbons, etc.

Other oxidation inhibitors or antioxidants useful in this invention comprise oil-soluble copper compounds. The copper may be blended into the oil as any suitable oilsoluble copper compound. By oil soluble it is meant that the compound is oil soluble under normal blending conditions in the oil or additive package. The copper compound may be in the cuprous or cupric form. The copper may be in the form of the copper dihydrocarbyl thio- or dithio-phosphates. Alternatively, the copper may be added as the copper salt of a synthetic or natural carboxylic acid. Examples of same thus include $C_{10}$ to $C_{18}$ fatty acids, such as stearic or palmitic acid, but unsaturated acids such as oleic or branched carboxylic acids such as napthenic acids of molecular weights of from about 200 to 500, or synthetic carboxylic acids, are preferred, because of the improved handling and solubility properties of the resulting copper carboxylates. Also useful are oil-soluble copper dithiocarbamates of the general formula $(RR'NCSS)_nCu$ (where n is 1 or 2 and R and R' are the same or different hydrocarbyl radicals containing from 1 to 18, and preferably 2 to 12, carbon atoms, and including radicals such as alkyl, alkenyl, aryl, aralkyl, alkaryl and cycloaliphatic radicals. Particularly preferred as R and R' groups are alkyl groups of from 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., R and R') will generally be about 5 or greater. Copper sulphonates, phenates, and acetylacetonates may also be used.

Exemplary of useful copper compounds are copper $Cu^I$ and/or $Cu^{II}$ salts of alkenyl succinic acids or anhydrides. The salts themselves may be basic, neutral or acidic. They may be formed by reacting (a) polyalkylene succinimides (having polymer groups of $M_n$ of 700 to 5,000) derived from polyalkylene-polyamines, which have at least one free carboxylic acid group, with (b) a reactive metal compound. Suitable reactive metal compounds include those such as cupric or cuprous hydroxides, oxides, acetates, borates, and carbonates or basic copper carbonate.

Examples of these metal salts are Cu salts of polyisobutenyl succinic anhydride, and Cu salts of polyisobutenyl succinic acid. Preferably, the selected metal employed is its divalent form, e.g., $Cu^{+2}$. The preferred substrates are polyalkenyl succinic acids in which the alkenyl group has a molecular weight greater than about 700. The alkenyl group desirably has a $M_n$ from about 900 to 1,400, and up to 2,500, with a $M_n$ of about 950 being most preferred. Especially preferred is polyisobutylene succinic anhydride or acid. These materials may desirably be dissolved in a solvent, such as a mineral oil, and heated in the presence of a water solution (or slurry) of the metal bearing material. Heating may take place between 70° and about 200° C. Temperatures of 110° C. to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-polyisobutenyl succinic anhydride, Cu-oleate, or mixtures thereof) will be generally employed in an amount of from about 50 to 500 ppm by weight of the metal, in the final lubricating or fuel composition.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutyenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydrocarbyl succinimide, S-carboxyalkylene hydrocarbyl succinamic acid and mixtures thereof; U.S. Pat. No. 3,879,306 which discloses N-(hydroxyalkyl)alkenyl-succinamic acids or succinimides; U.S. Pat. No. 3,932,290 which discloses reaction products of di- (lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are succinate esters, or metal salts thereof, of hydrocarbyl substituted succinic acids or anhydrides and thiobisalkanols such as described in U.S. Pat. No. 4,344,853.

Dispersants maintain oil insolubles, resulting from oxidation during use, in suspension in the fluid thus preventing sludge flocculation and precipitation or deposition on metal parts. Suitable dispersants include high molecular weight alkyl succinimides, the reaction product of oil-soluble polyisobutylene succinic anhydride with ethylene amines such as tetraethylene pentamine and borated salts thereof.

Pour point depressants, otherwise known as lube oil flow improvers, lower the temperature at which the fluid will flow or can be poured. Such additives are well known. Typically of those additives which usefully optimize the low temperature fluidity of the fluid are $C_8-C_{18}$ dialkylfumarate vinyl acetate copolymers, polymethacrylates, and wax naphthalene. Foam control can be provided by an antifoamant of the polysiloxane type, e.g., silicone oil and polydimethyl siloxane.

Anti-wear agents, as their name implies, reduce wear of metal parts. Representatives of conventional antiwear agents are zinc dialkyldithiophosphate and zinc diaryldithiosphate.

Detergents and metal rust inhibitors include the metal salts of sulphonic acids, alkyl phenols, sulfurized alkyl phenols, alkyl salicylates, naphthenates and other oil soluble mono- and di-carboxylic acids. Highly basic (viz, overbased) metal sales, such as highly basic alkaline earth metal sulfonates (especially Ca and Mg salts) are frequently used as detergents. Representative examples of such materials, and their methods of preparation, are found in co-pending Ser. No. 754,001, filed July 11, 1985, the disclosure of which is hereby incorporated by reference.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts which are effective to provide their normal attendant function. Representative effective amounts of such additives are illustrated as follows:

| Additive | Wt. % a.i. (Broad) | Wt. % a.i. (Preferred) |
|---|---|---|
| Viscosity Modifier | .01–12 | .01–4 |
| Corrosion Inhibitor | 0.01–5 | .01–1.5 |
| Oxidation Inhibitor | 0.01–5 | .01–1.5 |
| Dispersant | 0.1–20 | 0.1–8 |
| Pour Point Depressant | 0.01–5 | .01–1.5 |
| Anti-Foaming Agents | 0.001–3 | .001–0.15 |
| Anti-Wear Agents | 0.001–5 | .001–1.5 |
| Friction Modifiers | 0.01–5 | .01–1.5 |
| Detergents/Rust Inhibitors | .01–10 | .01–3 |
| Mineral Oil Base | Balance | Balance |

When other additives are employed, it may be desirable, although not necessary, to prepare additive concentrates comprising concentrated solutions or dispersions of the dispersant (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the dispersant additive and optional additional additives in proper amounts to provide the desired concentration in the final formulation when the additive-package is combined with a predetermined amount of base lubricant. Thus, the products of the present invention can be added to small amounts of base oil or other compatible solvents along with other desirable additives to form additive-packages containing active ingredients in collective amounts of typically from about 2.5 to about 90%, and preferably from about 5 to about 75%, and most preferably from about 8 to about 50% by weight additives in the appropriate proportions with the remainder being base oil.

The final formulations may employ typically about 10 wt. % of the additive-package with the remainder being base oil.

All of said weight percents expressed herein are based on active ingredient (a.i.) content of the additive, and/or upon the total weight of any additive-package, or formulation which will be the sum of the a.i. weight of each additive plus the weight of total oil or diluent.

This invention will be further understood by reference to the following examples, wherein all parts are parts by weight and all molecular weights are number weight average molecular weights as noted, and which include preferred embodiments of the invention.

The following examples (1–3) exemplify preparation of the monomers of sulfur mono- and diimides used in accordance with the present invention.

EXAMPLE 1

N-sulfinyl urethane was prepared by dissolving 181.6 grams of urethane and 150 ml. of thionyl chloride in 1.3 liters of ether, followed by cooling to 0° C. This solution was then stirred well and 324 ml. of dry pyridine was added in a dropwise manner at 0° C. to 5° C. over a two-hour period. When the reaction mixture reached room temperature, it was filtered, and the filtrate was then concentrated under vacuum. Vacuum distillation of the residue at 0.6 to 1.2 mm. yielded a total of 142.8 grams of N-sulfinyl urethane having a boiling point of from 23° C. to 28° C.

EXAMPLE 2

Dicarbethoxy sulfur diimide was prepared by dissolving 35.6 grams of urethane and 80 grams of pyridine in 500 ml. of dry toluene, at room temperature. Then 47.6 grams of thionyl chloride dissolved in 60 ml. of toluene was added to this stirred solution. The reaction temperature rose from 25° C. to 46° C. during this addition. Stirring was then continued overnight, and the reaction mixture was then filtered, and the filtrate was concentrated by roto evaporation at about 80° C. Vacuum distillation of the residue (37 grams) at 0.2 mm. provided an 80% yield of biscarbethoxy sulfur diimide with a boiling point of from 80° C. to 86° C.

EXAMPLE 3

Dibenzoyl sulfur diimide was prepared by adding 0.1 moles of benzamide and 0.25 moles of pyridine to 70 ml. of toluene, at room temperature. Then 0.1 moles of thionyl chloride dissolved in 10 ml. of toluene was added dropwise to the stirred mixture. The reaction temperature rose from 22° C. to 49° C. during this addition. After the mixture was stirred overnight at room temperature, the mother liquid was decanted from the pyridine hydrochloride salt, and roto-evaporated at 45° C. and a pressure of 4 mm. Recrystallization of the residue from toluene/pentane provided a 75% yield of the dibenzoyl sulfur diimide, having a melting point of from 116° C. to 118° C.

The following examples (4–12) exemplify preparation of the polymer adducts of the present invention, and the testing of certain of these adducts (Example 13) for sludge and varnish inhibition via the Sludge Inhibition Bench (SIB) test and the Varnish Inhibitor Bench (VIB) test, and engine performance testing (Example 7).

EXAMPLE 4

A polymer adduct in accordance with the present invention was prepared by dissolving about 50 grams of dry terpolymer (VISTALON 2504, a product of Exxon Chemical Company, a terpolymer of ethylene, propylene and 5-ethylidene-2-nobornene including about 50% ethylene, about 45% propylene, and about 5 wt. % of the 5-ethylidene-2nobornene, and having a Mooney viscosity of about 40 (Ml 1+8, 212° F.) the $\overline{M_n}$ of which, as measured by GPC, is about 64,000, and the $\overline{M_w}$, as measured by GPC, is about 135,000) in 500 ml. dry cyclohexane, and stirring at room temperature under a blanket of nitrogen. About 5.0 grams (about 0.024 moles) of bis-carboethoxy sulfur diimide were then added at room temperature. The reaction mixture was then stirred overnight at about 25° C., and about 75 ml. of the reaction mixture was then added to 1600 ml. of acetone. The polymer product produced thereby was then cast in the form of a film. IR analysis showed a strong ester carbonyl absorption band at 5.8 microns. The product was then redissolved in cyclohexane, and precipitated from 1600 ml. of acetone, and then dried overnight in a vacuum oven at room temperature. Elemental analysis of the product indicated that the polymer product contained 0.7% nitrogen and 1.50% sulfur. Dialysis of the product exhibited a residue which analyzed as 0.65% nitrogen and 1.13% sulfur, and gel permeation chromatography analysis demonstrated that functionalization of the polymer with the sulfur diimide did not significantly alter the grafted polymer MWD from that of the starting polymer MWD.

EXAMPLE 5

An N-sulfinyl urethane polymer adduct was prepared by dissolving 20 grams of VISTALON 2200 polymer (a product of Exxon Chemical Company, a terpolymer having a Mooney Viscosity, (Ml 1+8, 212° F.) of about 40, and having an ethylene content of about 50 wt. % and a 5-ethylidene-2norbornene content of about 2.5 wt. %, the remainder being propylene: the $\overline{M_n}$ as measured by GPC of VISTALON 2200 is about 47,000, the $\overline{M_w}$ as measured by GPC is about 174,000) in about 150 ml. of cyclohexane which was then stirred overnight at room temperature. To this polymer solution was then added at about 25° C., 0.5 grams of N-sulfinyl urethane dissolved in 10 ml. of cyclohexane. The reaction mixture was then heated to about 65° C. to 70° C. for three hours. An additional 2.5 grams of N-sulfinyl urethane was subsequently added, and the polymer solution was reacted at 50° C. for about six hours. The polymer adduct was isolated by gradually adding the polymer solution to a liter of dry acetone stirred at room temperature. The dried polymer features an infrared spectrum with a prominent ester carbonyl absorption band at 5.85 microns, and analyzed for 0.18% nitrogen and 0.41% sulfur.

EXAMPLE 6

A dicarbethoxy sulfur diimide polymer adduct was prepared by dissolving 10 grams of VISTALON 2200 in 190 ml. of cyclohexane, at room temperature. Then 0.4 grams of dicarbethoxy sulfur diimide in 10 ml. of cyclohexane was added dropwise to this stirred polymer solution, at room temperature. The reaction mixture was then heated to 70° C., and stirred at this temperature for about three hours, and then at room temperature over a weekend period. The polymer adduct was then isolated by gradually adding the reaction mixture to a large volume of dry acetone (about 2 liters). After drying, the isolated polymer analyzed for 0.214% nitrogen and 0.28% sulfur, and featured an infrared spectrum with a prominent ester carbonyl absorption band at 5.85 microns. The GPC of the polymer adduct was identical with that for VISTALON 2200, indicating that the molecular weight distribution of the polymer was not affected by modification with the dicarbethoxy sulfur diimide.

EXAMPLE 7

A dicarbethoxy sulfur diimide-polymer adduct was prepared by dissolving 180 grams of NORDEL 2052 (a product of Dupont Chemical Company, a terpolymer having a Mooney viscosity at 212° F. of about 25 and including about 53 wt. % of ethylene, about 3.5 wt. % of 1,4-hexadiene, and about 43.5% of propylene and having a $\overline{M_n}$ of about 55,000) in 1020 grams of mineral oil (S100NLP), and by then heating to 80° C. under a nitrogen atmosphere. Then 5.1 grams of dicarbethoxy sulfur diimide monomer dissolved in 50 grams of mineral was added to this stirred polymer solution in oil, at 80° C. After stirring the reaction mixture at 80° C. for about one and one-half hours, an additional 5.1 grams of sulfur diimide monomer in 50 grams of mineral oil were then added, and the mixture was stirred at 80° C. for an hour. The neat, dried polymer was isolated from the reaction mixture by precipitation in acetone. It analyzed for 0.165% nitrogen. In a similar manner, 144 grams of NORDEL 2052 dissolved in 1056 grams of mineral oil (S100LP) was reacted with 5 grams of dicarbethoxy sulfur diimide in 50 grams of mineral oil for one hour. A second portion of adduct (8 grams of adduct in 80 grams of mineral oil) was then added, and the reaction mixture was stirred at 80° C. for an hour. A sample of the neat, dried polymer was isolated from the reaction mixture and analyzed for 0.25% nitrogen.

The above polymer adducts were then combined and formulated in an SAE 10W-40 commercial detergent inhibitor package, and evaluated in the L-38 Test Method (ASTM STP 509A, Part IV) which is designed to evaluate crankcase lubricating oils for resistance to oxidation stability, corrosion, and sludge and varnish when subjected to high temperature operation. This formulation contained about 77.4 wt. % of an S100N hydrofined mineral lubricating oil composition, about 5.0 wt. % of a bright stock, about 1.4 wt. % of a 65%/35% $C_4/C_5$ zinc dialkyldithiophosphate concentrate having 75 wt. % active ingredient in a diluent oil, about 1.2 wt. % of a magnesium sulfonate concentrate with 400 total base number having 52 wt. % active ingredient in a diluent oil, about 0.3 wt. % of a cupric stearate concentrate having 40 wt. % active ingredient in a diluent oil, about 0.1 wt. % oleyl glyceride, about 0.4 wt. % of a commercial poly-alkylmethacrylate concentrate having 40 wt. active ingredient in a diluent oil, and about 14.2 wt. % of the dicarbethoxy sulfur diimide polymer adduct of this example. These polymer adducts were found to meet typical industrial requirements, as shown in Table 1 below.

TABLE 1

| | Test Result | Industry Requirement |
|---|---|---|
| Bearing weight loss, in milligrams | 14.7 | 40 |
| Piston Skirt Varnish Rating, merits | 9.8 | 9.0 |
| Oil Viscosity at 100° C., cSt | | |
| 0 hrs. | 14.60 | 12.5–16.3 |
| 10 hrs. | 13.64 | 12.5–16.3 |

EXAMPLE 8

A dicarbethoxy sulfur diimide-polymer adduct was prepared by dissolving about 50 grams of dry EPDM terpolymer (VISTALON 2504) in 500 ml. of dry cyclohexane, and stirring at room temperature under a blanket of nitrogen. About 5.0 grams (about 0.024 moles) of dicarbethoxy sulfur diimide was then added at room temperature. The reaction mixture was then stirred overnight at about 25° C., and about 75 ml. of the reaction mixture was then added to 1600 ml. of acetone. The polymer product produced thereby demonstrated a strong ester carbonyl absorption band at 5.8 microns in the infrared. The product was then redissolved in cyclohexane, precipitated from 1600 ml. of acetone, and then dried overnight in a vacuum oven, at room temperature. Element analysis of this product indicated that the polymer product contained 0.7% nitrogen and 1.50% sulfur, and gel permeation chromatography analysis demonstrated that functionalization of the polymer with the sulfur diimide did not alter the reactant polymer molecular weight distribution.

EXAMPLE 9

A dibenzoyl sulfur diimide polymer adduct was prepared by dissolving 10 grams of the VISTALON 2200 polymer in 190 grams of cyclohexane. Then 0.5 grams of dibenzoyl sulfur diimide in 20 ml. of $CH_2Cl_2$ was added dropwise to the stirred polymer solution at room temperature. The stirred reaction mixture was then heated to about 45° C. for three hours, and then at room temperature overnight. A sample of the neat, dried polymer analyzed for 0.274% nitrogen and 0.33% sulfur, and featured a gel permeation chromatogram (GPC) virtually identical to that for VISTALON 2200. The UV/GPC data clearly indicated that modifying polymers with sulfur diimides does not affect molecular weight distribution, and that the polymer was randomly functionalized.

Thermogravimetric analyses of VISTALON 2200 and the polymer adduct revealed that the onset of thermooxidative degradation (weight loss) is delayed from 381.7° C. (for VISTALON 2200) to 422.4° C. (for the functionalized polymer). Thus, the polymer adduct is stabilized towards degradation induced by heat and air.

EXAMPLE 10

A benzoyl carbethoxy sulfur diimide polymer adduct is prepared by repeating the procedure outlined in Example 9 but using benzoyl carbethoxy sulfur diimide in place of the dibenzoyl sulfur diimide.

A benzoyl carbethoxy sulfur diimide was formed by reacting 11.0 grams of dicarbethoxy sulfur diimide with 6 grams of benzamide and two drops of pyridine as catalyst in methylene chloride, at room temperature. A mass spectrometry measurement of this reaction product further reacted with ethylidene norbornane, in accordance with the procedure of Example 9, provided a mass spectrum consistent with that expected for the addition of benzoyl carbethoxy sulfur diimide to ethylidene norbornane.

EXAMPLE 11

A dicarbethoxy sulfur diimide-polybutene adduct was prepared by dissolving 10 grams of polybutene ($\overline{M_n}$ of about 950) in 100 ml. of toluene. Then 2.7 grams of the dicarbethoxy sulfur diimide was added dropwise to the solution, blanketed with nitrogen. The reaction mixture was then heated to 65° C. and stirred at this temperature for three hours. The reaction mixture was then filtered, and the filtrate was concentrated by rotoevaporation. The residue analyzed for 2.03% nitrogen, and showed an infrared spectrum with a strong ester carbonyl absorption band at 5.85 microns.

EXAMPLE 12

A dibenzoyl sulfur diimide-polybutene adduct was prepared by dissolving 10 grams of polybutene ($\overline{M_n}$ of about 950) in 100 ml. of toluene in a manner similar to that of Example 11. This mixture was then combined with 2.7 grams of dibenzoyl sulfur diimide (in 10 ml. of toluene) and refluxed at 110° C. for two hours. The mixture was then filtered, and the supernatant concentrated by rotoevaporation. The residue analyzed for 1.3% nitrogen.

EXAMPLE 13

The products of Examples 5, 6 and 9 were then tested for sludge inhibition properties (via the SIB test) and varnish inhibition properties (via the VIB test).

The SIB Test has been found, after a large number of evaluations, to be an excellent test for assessing the dispersing power of lubricating oil dispersant additives.

The medium chosen for the SIB test was a used crankcase mineral lubricating oil composition having an original viscosity of about 325 SUS at 38° C. that had been used in a taxicab that was driven generally for short trips only, thereby causing a buildup of a high concentration of sludge precursors. The oil that was used contained only a refined base mineral lubricating oil, a viscosity index improver, a pour point depressant and zinc dialkyldithiophosphate anti-wear additive. The oil contained no sludge dispersant. A quantity of such used oil was acquired by draining and refilling the taxicab crankcase at 1000-2000 mile intervals.

The SIB test is conducted in the following manner: The aforesaid used crankcase oil, which is milky brown in color, is freed of sludge by centrifuging for one hour at about 39,000 gravities (gs.). The resulting clear bright red supernatant oil is then decanted from the insoluble sludge particles thereby separated out. However, the supernatant oil still contains oil-soluble sludge precursors which on heating under the conditions employed by this test will tend to form additional oil-insoluble deposits of sludqe. The sludge inhibiting properties of the additives being tested are determined by adding to portions of the supernatant used oil, a small amount, such as 0.5, 1 or 2 weight percent, of the particular additive being tested. Ten grams of each blend being tested are placed in a stainless steel centrifuge tube and are heated at 135° C. for 16 hours in the presence of air. Following the heating, the tube containing the oil being tested is cooled and then centrifuged for about 30 minutes at room temperature at about 39,000 gs. Any deposits of new sludge that form in this step are separated from the oil by decanting the supernatant oil and then carefully washing the sludge deposits with 25 ml of heptane to remove all remaining oil from the sludge and further centrifuging. The weight of the new solid sludge that has been formed in the test, in milligrams, is determined by drying the residue and weighing it. The results are reported as amount of precipitated sludge in comparison with the precipitated sludge of a blank not containing any additional additive, which blank is normalized to a rating of 10. The less new sludge precipitated in the presence of the additive, the lower the SIB value and the more effective is the additive as a sludge dispersant. In other words, if the additive gives half as much precipitated sludge as the blank, then it would be rated 5.0 since the blank will be normalized to 10.

The VIB test was used to determine varnish inhibition. Here, each test sample consisted of 10 grams of lubricating oil containing a small amount of the additive being tested. The test oil to which the additive is admixed is of the same type as used in the above-described SIB test. Each ten gram sample was heat soaked overnight at about 140° C. and thereafter centrifuged to remove the sludge. The supernatant fluid of each sample was subjected to heat cycling from about 150° C. to room temperature over a period of 3.5 hours at a frequency of about 2 cycles per minute. During the heating phase, gas which was a mixture of about 0.7 volume percent $SO_2$, 1.4 volume percent NO and balance air was bubbled through the test samples. During the cooling phase water vapor was bubbled through the test samples. At the end of the test period, which testing cycle can be repeated as necessary to determine the inhibiting effect of any additive, the wall surfaces of the test flasks in which the samples were contained are visually evaluated as to the varnish inhibition. The amount of varnish imposed on the walls is rated to values of from 1 to 11 with the higher number being the greater amount of varnish, in comparison with a blank with no additive that was rated 11.

10.00 grams of SIB test oil were mixed with 0.08 grams of the products of Examples 5, 6 and 9 and tested in the aforedescribed SIB and VIB tests.

The test results are summarized below in Table 2.

TABLE 2

| Additive | SIB | VIB |
|---|---|---|
| None | 10 | 11 |
| +0.8 wt. % | | |
| Example 5 | 9.8 | 3 |
| 6 | 9.6 | 3 |
| 9 | 8.8 | 4 |

As shown by the above test data, the additive of Examples 5, 6 and 9 gave good results in varnish inhibition and had sludge dispersing ability Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. A fuel oil composition comprising a major amount of fuel and a minor amount of reaction product of (i) sulfur monoimide, diimide or mixture thereof, and (ii) olefinic hydrocarbon having a minor amount of ethylenic unsaturation and having at least about 18 carbon atoms.

2. The fuel oil composition according to claim 1 wherein said olefinic hydrocarbon is selected from the group consisting of octadecene, eicosene, and octacosene.

3. The fuel oil composition according to claim 1 wherein said olefinic hydrocarbon comprises olefin polymer which comprises a terpolymer of ethylene, at least one $C_3$ to $C_{50}$ alpha-monoolefin and at least one $C_5$ to $C_{24}$ non-conjugated diene.

4. The fuel oil composition according to claim 3 wherein said non-conjugated diene comprises at least one member selected from the group consisting of 5-ethylidene-2-norbornene and 1,4-hexadiene.

5. The fuel oil composition according to claim 1, wherein said olefinic hydrocarbon comprises olefinic polymer selected from the group consisting of at least partially hydrogenated random, tapered and block copolymers of conjugated dienes and monovinyl aromatic compounds.

6. The fuel oil composition according to claim 5 wherein said olefinic polymer comprises a copolymer of said conjugated dienes and said monovinyl aromatic compounds.

7. The fuel oil composition according to claim 5 wherein said olefinic polymer comprises said copolymers of said conjugated dienes and said monovinyl aromatic compounds further including a compound selected from the group consisting of the alpha-olefins and lower alkenes.

8. The fuel oil composition according to claim 1 wherein said olefinic hydrocarbon comprises olefinic polymer comprising a homopolymer of butenes.

9. The fuel oil composition according to claim 1 wherein said olefinic hydrocarbon comprises olefinic polymer comprising a copolymer of butenes and at least one $C_2$ to $C_{10}$ monolefin.

10. The fuel oil composition according to claim 1 wherein said olefinic hydrocarbon polymer comprises olefinic polymer selected from the group consisting of homopolymers and random, tapered and block copolymers of conjugated dienes, alpha-olefins, and lower alkenes.

11. The fuel oil composition according to claim 1 wherein said olefinic hydrocarbon comprises olefinic polymer selected from the group consisting of the homopolymers and copolymers of the $C_2$ to $C_{30}$ olefins.

12. The fuel oil composition according to claim 11 wherein said $C_2$ to $C_3$ olefin comprises butenes.

13. The fuel oil composition according to claim 11 wherein said olefinic hydrocarbon comprises olefinic polymer having a number average molecular weight of at least 500.

14. The fuel oil composition according to claim 1 wherein said sulfur mono- or diimide is represented by formula:

wherein $X=$ is selected from the group consisting of $O=$, $S=$, and $Y'-N=$, wherein $-Y$ and $Y'-$ are independently selected from the group consisting of

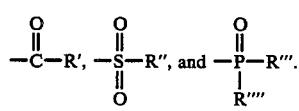

wherein $R'$ is selected from the group consisting of hydrocarbyl and hydrocarbyloxy, $R''$ comprises a hydrocarbyl substituent, and $R'''$ and $R''''$ are independently selected from hydrocarbyloxy, and wherein each of $R'$, $R''$, $R'''$, and $R''''$ comprise from about 1 to 20 carbon atoms.

15. The fuel oil composition according to claim 14 wherein said sulfur mono- or diimide comprises a sulfur diimide represented by the formula $Y'-N=S=N-Y$, wherein $-Y$ and $Y'-$ are independently selected from the group consisting of

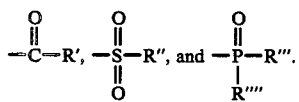

16. The fuel oil composition according to claim 15 wherein $-Y$ and $Y'-$ each comprise

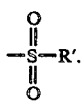

17. The fuel oil composition according to claim 14 wherein said sulfur mono- or diimide comprises a monoimide represented by the formula $O=S=N-Y$, wherein Y is elected from the group consisting of

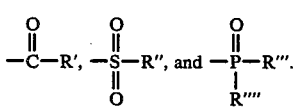

* * * * *